UNITED STATES PATENT OFFICE.

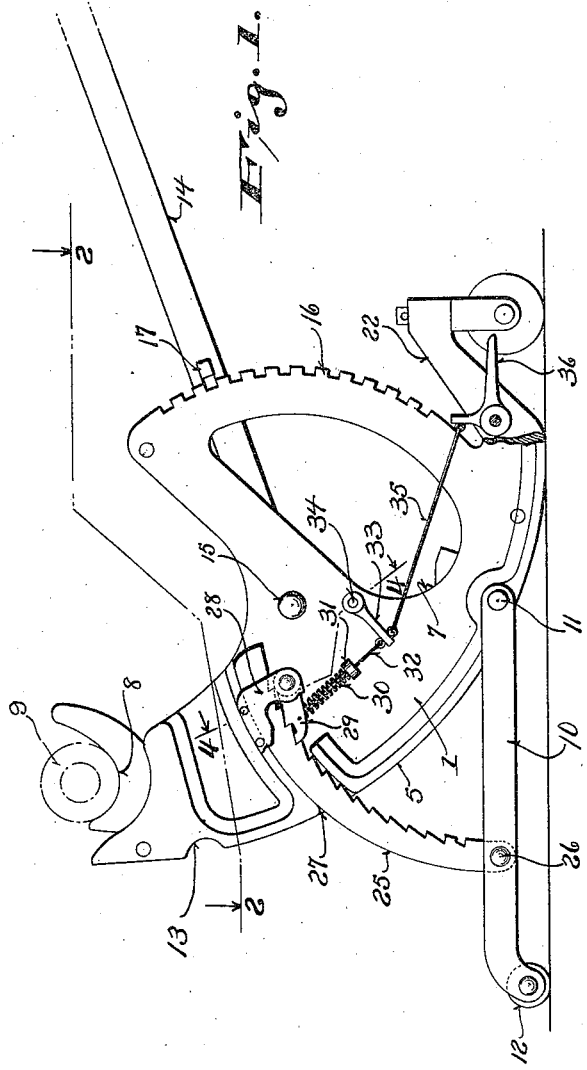
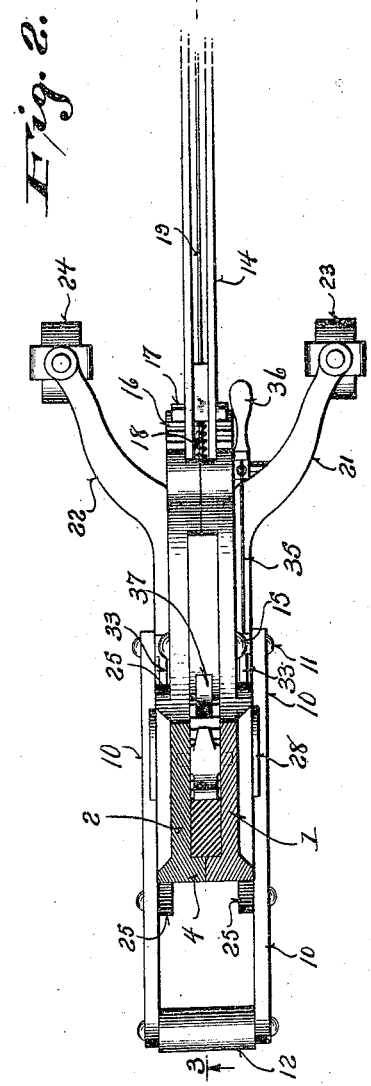

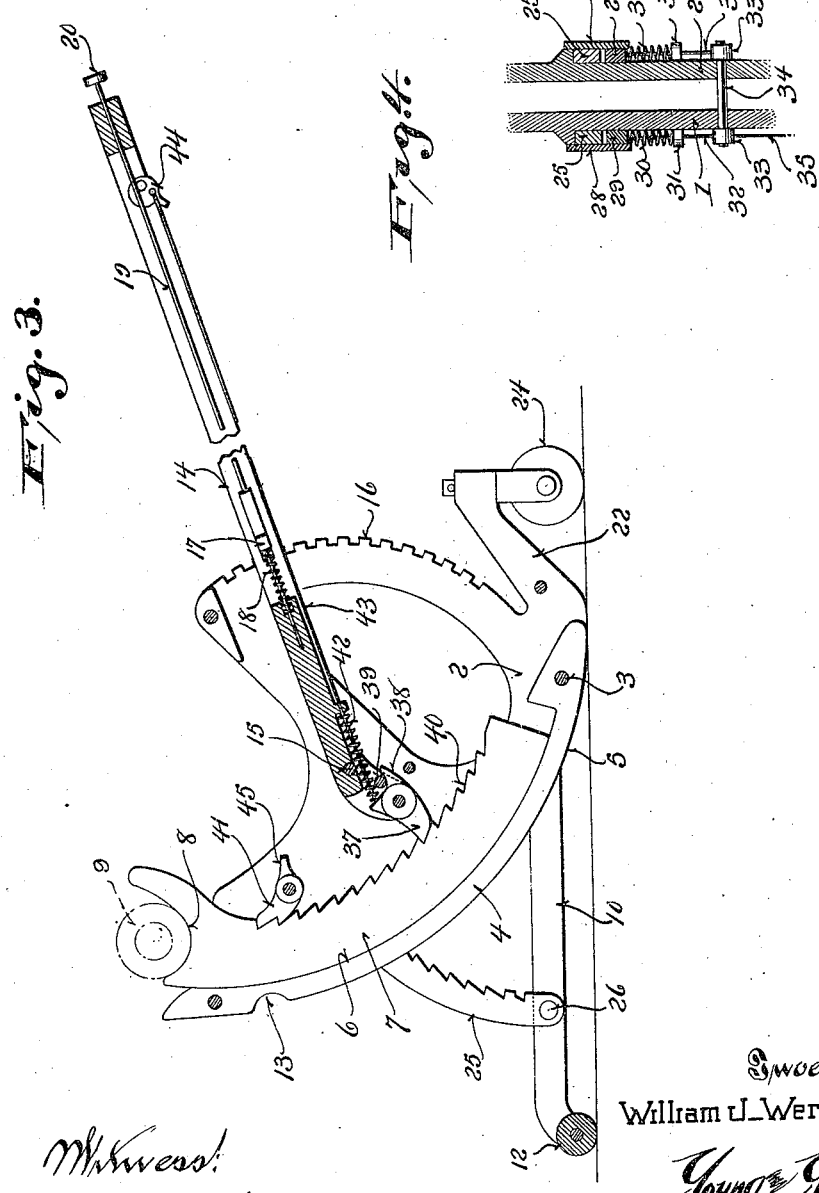

WILLIAM J. WERNER, OF NEW LONDON, WISCONSIN.

JACK.

1,414,004.  Specification of Letters Patent.  Patented Apr. 25, 1922.

Application filed June 17, 1921. Serial No. 478,246.

*To all whom it may concern:*

Be it known that I, WILLIAM J. WERNER, a citizen of the United States, and resident of New London, in the county of Waupaca and State of Wisconsin, have invented certain new and useful Improvements in Jacks; and I do hereby declare that the following is a full, clear, and exact description thereof.

My invention relates to a new and improved jack and more particularly to a jack of the type which is especially adapted for use in jacking up a vehicle axle or the like.

One of the important objects of the invention is to provide a jack of this type which may be quickly adjusted and applied to an axle at any height, thus saving considerable time.

A more specific object of the invention is to provide a jack which may be raised to engage the axle by a single movement of the lever using a comparatively low leverage ratio and subsequently extended by another movement of the lever using a comparatively high leverage ratio.

Other objects and advantages of my improved construction will be apparent from the following description in connection with the accompanying drawings:—

Figure 1 is a side elevation with portions broken away.

Figure 2 is a sectional plan view on the line 2—2 of Figure 1.

Figure 3 is a longitudinal sectional view on the line 3—3 of Figure 2.

Figure 4 is a sectional detail view on the line 4—4 of Figure 1.

As shown in the drawings the body of my improved jack consists of a supporting member formed of two complementary sections 1 and 2 which are secured together by rivets 3 or the like. The lower edges of these sections are formed with arcuate flanges, the outer surface 5 of which is adapted to roll along the ground or floor. The inner faces 6 of the flanges form an arcuate guideway in which the telescoping arm 7 is slidably mounted. The upper end of this arm is formed with a concave seat 8 which is adapted to engage the axle 9. A yoke 10 is pivoted to the supporting member 1 at 11 and a roller 12 is mounted in the outer end of the yoke. The member 1 is provided with a notch 13 which engages the roller 12 when the jack is in its folded or lowermost position.

In order to raise the support by rolling it along its arcuate edge 5, a lever 14 is provided which is pivoted at 15 and extends outwardly through an opening between the segmental racks 16 which are formed in one side of the sections 1 and 2. A T shaped pawl 17 is slidably mounted in the lever so that the arms thereof are engageable in the notches of the racks 16. The pawl is urged in one direction to engage the notches by the spring 18 and is moved in the other direction to release the same by means of the rod 19 which extends outwardly through the end of the lever and is provided with a head 20. It will be seen therefore that with the pawl 17 engaging the racks, the lever 14 may be moved to raise the sections 1 and 2 to their uppermost position as shown in Figures 1 and 3. Laterally projecting arms 21 and 22 which in the present instance are formed integral with sections 1 and 2 respectively are provided for steadying the jack in this position and these arms are provided at their outer ends with the caster wheels 23 and 24. The jack is supported on the other side by the yoke 10 and roller 12 through the medium of the arcuate ratchet arms 25 which are pivoted at 26 to the respective sides of the yoke, each arm extending upwardly through a guideway 27 and a keeper 28. Pawls 29 are provided at each side which cooperate with the ratchet teeth to retain the jack in its raised position. Each pawl 29 is normally held in engagement with the ratchet teeth by a coil spring 30 which acts between the pawl and a lug 31 provided on one of the sections. Similar pawls are provided at both sides of the jack. For releasing the pawls, a rod 32 is connected at one end with the pawl and at the other end with a radius arm 33 secured to a rock shaft 34. One of the radius arms 33 is connected by the link 35 with a foot lever 36 which is in the shape of a bell crank. The pawls 29 therefore will both be released from the ratchet teeth on the yoke by stepping on the foot lever 36. By means of the mechanism heretofore described the jack may be quickly raised by one movement of the lever 14 until the axle is engaged by the seat 8 in the end of the telescoping arm 7. The arm 7 may then be extended by releasing the lever from the racks 16 and rocking it upon its pivot 15. A pawl 37 is pivoted to the inner end of the lever and is provided with a heel 38 which normally engages a stop 39. When the lever is rocked about its pivot 15 therefore, the end of the pawl 37 which is in engagement with the teeth 40 of the telescoping arm 7 will raise the same and the arm will be held in its raised or extended position by the gravity pawl 41. The pawl 37 is held in its extended position by the spring 42 but may be released therefrom by means of the rod 43 which is connected at one end with the pawl and at its other end with the eccentric 44. After the sections 1 and 2 have been raised to the position shown in Figures 1 and 3, the arm 7 may be extended as heretofore described by rocking the lever 14 back and forth about its pivot. When it is desired to lower the jack the pawl 41 may be released by means of the forwardly extending finger 45 and the pawl 37 may be retracted by moving the eccentric 44 about its pivot. From the foregoing description it will be seen that I have provided a comparatively simple and inexpensive device which may be instantly applied to the axle by one continuous movement of the lever 14.

Then upon releasing the pawl 17 from the racks 16 the arm 7 may be quickly extended by a simple rocking movement of the lever. The racks 16 allow the lever 14 to be adjusted in the most favorable position for effecting the first mentioned movement and the ratchet arm 25 permits the jack to be held in its adjusted position while the telescoping arm 7 is being extended.

While I have described specifically the structural details of one form in which my invention may be embodied it will be understood that many modifications may be made therein without departing from the spirit of the invention as defined in the appended claims.

I claim as my invention:—

1. A jack comprising a supporting member mounted for rocking movement, said supporting member having a telescoping portion with a seat thereon for engaging the object to be lifted, a lever pivoted to the supporting member and engageable therewith to rock the same, said lever, when not so engaged, being operable to extend said telescoping portion.

2. A jack comprising a supporting member having a curved side, means for rocking said member with its curved side in contact with the floor, a brace arm pivoted at one end to the supporting member, the other end of said arm being adapted to engage the floor, a ratchet arm connected with said brace arm, a pawl on the supporting member cooperating with the ratchet to retain said supporting member in the position to which it is rocked, said supporting member having a telescoping portion with a seat thereon for engaging the object to be lifted and means for extending said portion.

3. A jack comprising a supporting member mounted for rocking movement, said supporting member having a telescoping portion with a seat thereon for engaging the object to be lifted, a lever pivoted to the supporting member and engageable therewith to rock the same, means for retaining the supporting member in the position to which it has been rocked, said lever, when not engaged with the supporting member, being operable to extend said telescoping portion, and a pawl and ratchet for retaining said telescoping portion against return movement.

In testimony that I claim the foregoing I have hereunto set my hand at New London, in the county of Waupaca and State of Wisconsin.

WILLIAM J. WERNER.